US012696030B2

(12) United States Patent
Zeng

(10) Patent No.: US 12,696,030 B2
(45) Date of Patent: Jul. 28, 2026

(54) METHOD AND DEVICE OF ACTIVE NOISE REDUCTION FOR EARPHONE, EARPHONE, AND COMPUTER READABLE STORAGE MEDIUM

(71) Applicant: GOERTEK TECHNOLOGY CO., LTD., Qingdao (CN)

(72) Inventor: Kai Zeng, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 147 days.

(21) Appl. No.: 18/660,416

(22) Filed: May 10, 2024

(65) Prior Publication Data

US 2024/0292144 A1 Aug. 29, 2024

Related U.S. Application Data

(63) Continuation of application No. PCT/CN2021/138981, filed on Dec. 17, 2021.

(30) Foreign Application Priority Data

Nov. 29, 2021 (CN) ........................ 202111479449.7

(51) Int. Cl.
*G10K 11/16* (2006.01)
*H04R 1/10* (2006.01)
*H04R 29/00* (2006.01)

(52) U.S. Cl.
CPC ......... *H04R 1/1083* (2013.01); *H04R 1/1041* (2013.01); *H04R 29/00* (2013.01); *H04R 2460/01* (2013.01)

(58) Field of Classification Search
CPC ........ H04R 1/1041; H04R 1/10; H04R 29/00; H04R 1/1083; H04R 2460/01; G10K 11/178
(Continued)

(56) References Cited

U.S. PATENT DOCUMENTS

2015/0243271 A1 8/2015 Goldstein

FOREIGN PATENT DOCUMENTS

CN 106941637 A 7/2017
CN 108377436 A 8/2018
(Continued)

OTHER PUBLICATIONS

First Office Action in Corresponding Chinese Application No. 202111479449.7, dated May 25, 2022; 15 pgs.
(Continued)

*Primary Examiner* — Md S Elahee
(74) *Attorney, Agent, or Firm* — HAUPTMAN HAM, LLP

(57) ABSTRACT

Disclosed are a method and a device of active noise reduction for an earphone, and an active noise reduction earphone and a computer-readable storage medium. The method of active noise reduction for the earphone includes the following steps: obtaining wearing fit information of the earphone, the earphone includes a first earphone and a second earphone; obtaining optimal noise reduction information of the earphone according to the wearing fit information; obtaining a common noise reduction amount according to the optimal noise reduction information; and controlling the first earphone and the second earphone to reduce noise according to the common noise reduction amount.

9 Claims, 4 Drawing Sheets

(58) Field of Classification Search
USPC .......................................................... 381/71.1
See application file for complete search history.

(56) References Cited

FOREIGN PATENT DOCUMENTS

| | | | | |
|---|---|---|---|---|
| CN | 110784804 A | 2/2020 | | |
| CN | 111541966 A | 8/2020 | | |
| CN | 111781555 A | 10/2020 | | |
| CN | 111836147 A | 10/2020 | | |
| CN | 112468924 A | * 3/2021 | | H04R 1/1083 |
| WO | WO-2020058730 A1 | * 3/2020 | | G10K 11/178 |
| WO | 2021189309 A1 | 9/2021 | | |
| WO | 2021227695 A1 | 11/2021 | | |

OTHER PUBLICATIONS

Grant Notification in Corresponding Chinese Application No. 202111479449.7, dated Jan. 5, 2023; 5 pgs.
International Search Report and Written Opinion in Corresponding International Application No. PCT/CN2021/138981, mailed Jul. 1, 2022; 12 pgs.

* cited by examiner

METHOD AND DEVICE OF ACTIVE NOISE REDUCTION FOR EARPHONE, EARPHONE, AND COMPUTER READABLE STORAGE MEDIUM

CROSS-REFERENCE TO RELATED APPLICATIONS

The present application is a continuation application of International Application No. PCT/CN2021/138981, filed on Dec. 17, 2021, which claims priority to Chinese patent application No. 202111479449.7, entitled in "METHOD AND DEVICE OF ACTIVE NOISE REDUCTION FOR EARPHONE, EARPHONE, AND COMPUTER READABLE STORAGE MEDIUM" and filed on Nov. 29, 2021. The disclosures of the above-mentioned applications are incorporated herein by reference in their entireties.

TECHNICAL FIELD

The present application relates to the technical field of earphone active noise reduction, and in particular to a method and a device of active noise reduction for an earphone, an earphone, and a computer readable storage medium.

BACKGROUND

Noise reduction earphones can reduce environmental noise and improve the listening experience of users. Therefore, noise reduction earphones are increasingly favored by consumers. At present, the active noise reduction earphones on the market mainly perform corresponding leakage compensation according to the fit between the user and the earphones, so as to achieve the ideal noise reduction effect. However, in the actual use of the user, there is often a difference between the degree of fit of the earphone on the left ear and the degree of fit of the earphone on the right ear. Under the difference in fit between the left and right earphones, the amount of noise reduction that the left and right earphones can achieve is also inconsistent, thereby resulting in inconsistent noise reduction effects of the left and right earphones.

The above content is only configured to assist in understanding the technical solution of the present application, and does not mean that the above content is admitted as prior art.

SUMMARY

The main purpose of the present application is to provide a method of active noise reduction for an earphone, aiming to solve the technical problem of inconsistent noise reduction effects of the left and right earphones.

In order to achieve the above purpose, the present application provides a method of active noise reduction for an earphone, including:

obtaining wearing fit information of the earphone, the earphone includes a first earphone and a second earphone;

obtaining optimal noise reduction information of the earphone according to the wearing fit information;

obtaining a common noise reduction amount according to the optimal noise reduction information; and controlling the first earphone and the second earphone to perform noise reduction according to the common noise reduction amount.

In an embodiment, the optimal noise reduction information includes a first optimal noise reduction amount and a second optimal noise reduction amount; the wearing fit information including first frequency response information of the first earphone and second frequency response information of the second earphone;

the obtaining the optimal noise reduction information of the earphone according to the wearing fit information includes:

obtaining the first optimal noise reduction amount and the second optimal noise reduction amount according to the first frequency response information, the second frequency response information, and a mapping table between preset frequency response information and an optimal noise reduction amount.

In an embodiment, the obtaining the common noise reduction amount according to the optimal noise reduction information includes:

determining whether the first optimal noise reduction amount is greater than the second optimal noise reduction amount;

in response to that the first optimal noise reduction amount is greater than the second optimal noise reduction amount, configuring the second optimal noise reduction amount as the common noise reduction amount; and in response to that the first optimal noise reduction amount is less than or equal to the second optimal noise reduction amount, configuring the first optimal noise reduction amount as the common noise reduction amount.

In an embodiment, the controlling the first earphone and the second earphone to perform noise reduction according to the common noise reduction amount includes:

adjusting active noise reduction parameters of the first earphone and the second earphone, so as to adjust a current noise reduction amount of the first earphone and the second earphone to the common noise reduction amount in a first preset amplitude.

In an embodiment, before the controlling the first earphone and the second earphone to perform noise reduction according to the common noise reduction amount, the method further includes:

adjusting active noise reduction parameters of the first earphone and the second earphone, so as to monotonically decrease a current noise reduction amount of the first earphone and the second earphone to a preset minimum noise reduction amount in a second preset amplitude.

In an embodiment, the wearing fit information further includes a current noise reduction amount of the earphone, and after the obtaining the wearing fit information of the earphone, the method further includes:

determining whether the current noise reduction amount is less than a preset minimum noise reduction amount;

in response to that the current noise reduction amount is less than the preset minimum noise reduction amount, outputting a preset reminder message to remind the user to wear the earphone again; and in response to that the current noise reduction amount is greater than or equal to the preset minimum noise reduction amount, obtaining the optimal noise reduction information of the earphone according to the wearing fit information.

In an embodiment, before the obtaining the wearing fit information of the earphone, the method further includes:

determining whether preset trigger information is received by the earphone; and in response to that the preset trigger information is received, obtaining the wearing fit information of the earphone.

In addition, in order to achieve the above purpose, the present application provides a device of active noise reduction for an earphone, including:

a detection module, configured to obtain wearing fit information of the earphone, the earphone includes a first earphone and a second earphone;

an operation module, configured to obtain optimal noise reduction information of the earphone according to the wearing fit information;

a selection module, configured to obtain a common noise reduction amount according to the optimal noise reduction information; and an execution module, configured to control the first earphone and the second earphone to perform noise reduction according to the common noise reduction amount.

In addition, in order to achieve the above purpose, the present application provides an active noise reduction earphone, including:

a memory;

a processor; and a computer program stored in the memory and operable on the processor;

when the computer program is executed by the processor, the steps of the method of active noise reduction for the earphone are realized.

In addition, in order to achieve the above purpose, the present application provides a computer-readable storage medium, storing an active noise reduction program, when the active noise reduction program is executed by a processor, the steps of the method of active noise reduction for the earphone are realized.

The present application provides a method of active noise reduction for an earphone. The wearing fit information of the earphone can be obtained by detecting the leakage information of the sound wave in real time or periodically. The wearing fit information includes wearing fit information of the first earphone and wearing fit information of the second earphone. The optimal noise reduction information corresponding to the first earphone and the second earphone can be obtained based on the corresponding relationship between different wearing fit degrees and the theoretical optimal noise reduction amount according to the wearing fit information of the first earphone and the wearing fit information of the second earphone. By analyzing the optimal noise reduction information, the amount of noise reduction that can be achieved by both the first earphone and the second earphone is obtained as the common noise reduction amount; by adjusting the current active noise reduction parameters of the first earphone and the second earphone, so as to adjust the current noise reduction amounts of the first earphone and the second earphone to the common noise reduction amount, thereby realizing the consistency of the noise reduction effects of the first earphone and the second earphone.

BRIEF DESCRIPTION OF THE DRAWINGS

The accompanying drawings, which are incorporated in and constitute a part of this description, illustrate embodiments consistent with the present application and together with the description serve to explain the principles of the present application. In order to more clearly illustrate the technical solutions of the embodiments of the present application, the accompanying drawings that need to be used in the description of the embodiments will be briefly introduced below. Obviously, for those skilled in the art, other drawings can be obtained based on these drawings without exerting any creative effort.

Figure 1:
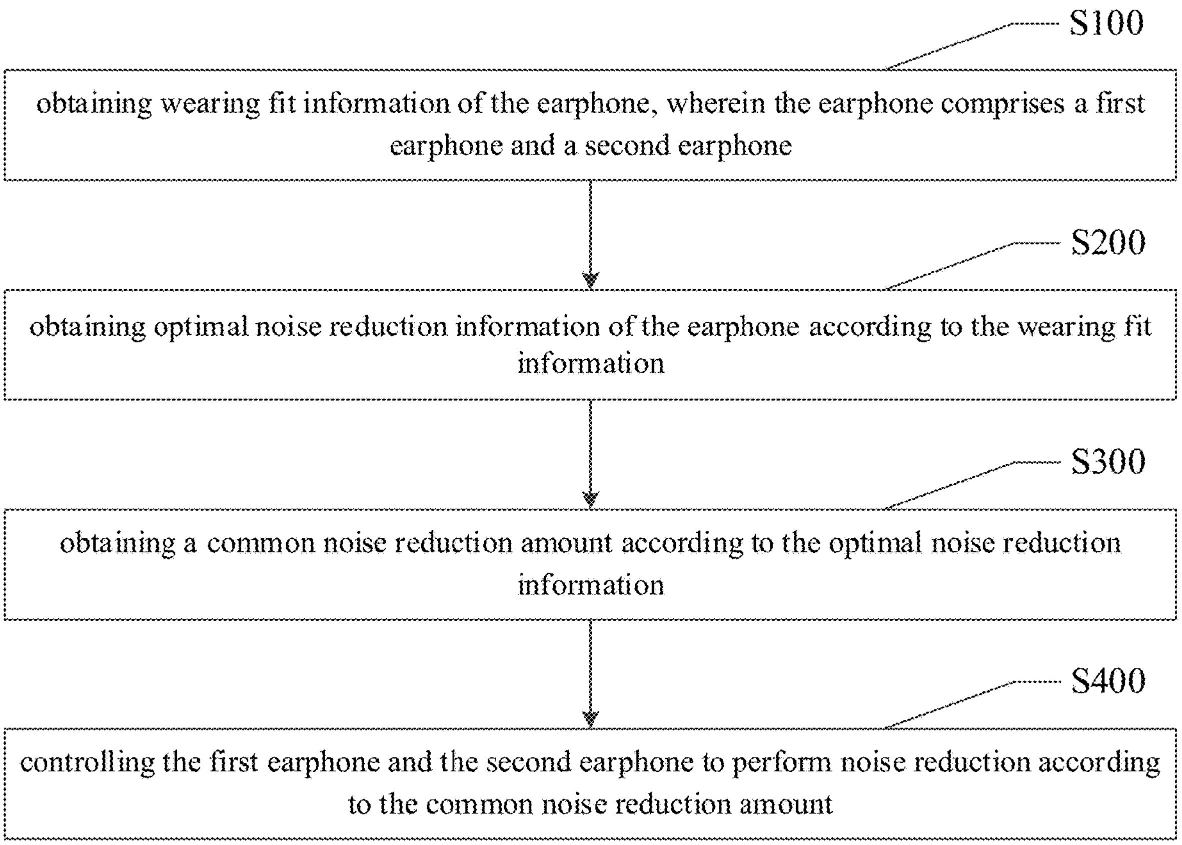
FIG. 1 is a schematic flow diagram of a method of active noise reduction for an earphone according to a first embodiment of the present application.

The realization, functional features and advantages of the present application will be further described in conjunction with the embodiments and with reference to the accompanying drawings. By means of the above drawings, specific embodiments of the present application have been shown, which will be described in more detail hereinafter. These drawings and text descriptions are not intended to limit the scope of the concept of the present application in any way, but to illustrate the concept of the present application for those skilled in the art by referring to specific embodiments.

DETAILED DESCRIPTION OF THE EMBODIMENTS

Reference will now be made in detail to the exemplary embodiments, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of apparatuses and methods consistent with aspects of the present application as recited in the appended claims.

It should be noted that, in this text, the term "comprising", "including" or any other variation thereof is intended to cover a non-exclusive inclusion such that a process, method, article or apparatus including a set of elements includes not only those elements, but also includes other elements not expressly listed, or elements inherent in the process, method, article, or device. Without further limitations, an element defined by the statement "comprising a . . . " does not exclude the presence of other identical elements in the process, method, article, or device that includes the element. In addition, in different implementations of the present application, components, features, and elements with the same name in the example may have the same meaning, or may have different meanings, and the specific meaning shall be determined based on the explanation in the specific embodiment or further combined with the context in the specific embodiment.

It should be understood that although the terms first, second, third, etc. may be used herein to describe various information, such information should not be limited to these terms. These terms are only configured to distinguish information of the same type from one another. For example, without departing from the scope of this text, first information may also be called second information, and similarly, second information may also be called first information. Depending on the context, the word “if” as used herein may be interpreted as “at” or “when” or “in response to determining”. Furthermore, as used herein, the singular forms “a”, “an” and “the” are intended to include the plural forms as well, unless the context indicates otherwise. It should be further understood that the terms “comprising”, “including” indicate the presence of features, steps, operations, elements, components, items, species, and/or groups, but do not exclude the existence, occurrence, or addition of one or more other features, steps, operations, elements, components, items, categories, and/or groups. The terms “or”, “and/or”, “comprising at least one of” and the like used in the present application may be interpreted as inclusive, or mean any one or any combination. For example, “including at least one of the following: A, B, C” means “any of the following: A; B; C; A and B; A and C; B and C; A and B and C”; for another example, “A, B or C” or “A, B and/or C” means “any of the following: A; B; C; A and B; A and C; B and C; A and B and C”. Exceptions to this definition will only arise when combinations of elements, functions, steps or operations are inherently mutually exclusive in some way.

It should be understood that although the various steps in the flow chart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages, these sub-steps or stages are not necessarily executed at the same time, but may be executed at different times, and the execution order is not necessarily sequential. Instead, it may be performed alternately or alternately with at least a part of other steps or sub-steps or stages of other steps.

Depending on the context, the words “if”, “in case” as used herein may be interpreted as “at” or “when” or “in response to determining” or “in response to detecting”. Similarly, depending on the context, the phrases “if determined” or “if detected (the stated condition or event)” could be interpreted as “when determined” or “in response to the determining” or “when detected (the stated condition or event)” or “in response to detecting (a stated condition or event)”.

It should be noted that, in this article, step codes such as S100 and S200 are used, the purpose of which is to express the corresponding content more clearly and concisely, and does not constitute a substantive limitation on the order. Those skilled in the art, during specific implementation, may perform S200 first, followed by S100, etc., but these should be within the protection scope of the present application.

It should be understood that the specific embodiments described here are only configured to explain the present application, and are not intended to limit the present application.

In the following description, the use of suffixes such as “module”, “part” or “unit” for denoting elements is only for facilitating the description of the present application and has no specific meaning by itself. Therefore, “module”, “part” or “unit” may be mixedly used.

Referring to FIG. 1, the first embodiment of the present application provides a method of active noise reduction for an earphone, including:

Step S100, obtaining wearing fit information of earphones; the earphones include a first earphone and a second earphone;

Specifically, the earphone includes a first earphone and a second earphone, the first earphone may be a right earphone or a left earphone, and the second earphone is another earphone. The internal audio information of the environment where the earphone is located (that is, the cavity formed by the earphone and the user’s ear canal) and the external audio information of the external environment collected by the earphone can be collected by the in-ear microphone of the earphone in real time or periodically. The internal audio information and the external audio information are processed to obtain the leakage information of the sound wave, and further obtain earphone wearing fit information.

In another embodiment, the following steps are also included before step S100:

Step S110, determining whether the earphone has received preset trigger information;

Step S111, in response to that the preset trigger information is received, step S100 is executed.

Specifically, the preset trigger information may be user touch information and/or voice control information, or instruction information issued by the built-in control device of the earphone, such as a trigger instruction issued after reaching a preset trigger period. It is determined that whether the earphone has received the preset trigger information; if the earphone has received the preset trigger information, the step of obtaining the wearing fit information of the earphone is performed. If the earphone does not receive the preset trigger information, no subsequent operations are performed. In this way, it is avoided that in the case of obtaining the wearing fit information of the earphones in real time, the power consumption of the earphones is high, resulting in a decrease in battery life of the earphones. In this embodiment, the battery life of the earphone is improved by performing step S100 only after receiving the preset trigger information.

In another embodiment, the wearing fit information also includes the current noise reduction amount of the earphone, and after step S100, the following steps are further included:

Step S120, determining whether the current noise reduction amount is less than a preset minimum noise reduction amount;

Step S121, in response to that the current noise reduction amount is less than the preset minimum noise reduction amount, outputting a preset reminder message to remind the user to wear the earphone again;

Step S122, in response to that the current noise reduction amount is greater than or equal to the preset minimum noise reduction amount, performing a step of obtaining the optimal noise reduction information of the earphone according to the wearing fit information.

Specifically, the wearing fit information also includes the current noise reduction amount of the earphone; according to the internal audio information of the cavity formed by the earphone and the user’s ear canal collected by the earphone’s in-ear microphone and the external audio information in the external environment collected by the out-of-ear microphone, the current noise reduction amount can be obtained. The current noise reduction amount can be the ratio of the audio energy collected by the external-ear microphone and the internal-ear microphone; it can also be the ratio of the audio amplitude collected by the external-ear microphone and the internal-ear microphone; it can also be the difference in the LOG domain of the audio signal collected by the external-ear microphone and the internal-ear microphone; it can also be the ratio of the power or amplitude in the frequency domain after the audio signals collected by the external-ear microphone and the internal-ear microphone are first Fourier transformed. The preset minimum noise reduction amount is the minimum noise reduction amount that can be achieved by compensating for leaked sound waves when the wearing fit of the earphones obtained through experimental testing and calibration is the preset minimum wearing fit. By determining whether the current noise reduction amount is less than the preset minimum noise reduction amount; if the current noise reduction amount is less than the preset minimum noise reduction amount, it indicates that the current wearing fit of the earphone is lower than the preset minimum wearing fit; if the preset minimum noise reduction amount cannot be reached, then the preset reminder message will be output to remind the user to wear the earphones again, so that the user can put on the earphones again and improve the wearing fit; if the current noise reduction amount is greater than or equal to the preset minimum noise reduction amount, step S200 is executed.

Step S200, according to the wearing fit information, obtaining the optimal noise reduction information of the earphone;

Specifically, the wearing fit information includes the wearing fit information of the first earphone and the wearing fit information of the second earphone. According to the wearing fit information of the first earphone and the wearing fit information of the second earphone, based on the corresponding relationship between preset different wearing fit degrees and the theoretical optimal noise reduction amount, the optimal noise reduction information of the earphone can be obtained (the optimal noise reduction amount in the wearing state of the first earphone and the optimal noise reduction amount in the wearing state of the second earphone). The wearing fit information can be obtained through preset sensors (such as capacitive sensors, optical sensors, etc.) or sound wave leakage. For example, the wearing fit information includes fit grades, which are divided into a preset number of fit grades from tight to loose. The corresponding optimal noise reduction amount can be obtained according to the preset mapping table of fit grades and optimal noise reduction.

In another embodiment, the optimal noise reduction information includes a first optimal noise reduction amount and a second optimal noise reduction amount, and step S200 includes: the wearing fit information includes the first frequency response information of the first earphone and second frequency response information of the second earphone;

Step S210, according to the first frequency response information, the second frequency response information, and the mapping table between the preset frequency response information and the optimal noise reduction amount, obtaining the first optimal noise reduction amount and the second optimal noise reduction amount.

Specifically, the wearing fit information includes first frequency response information in a wearing state of the first earphone and second frequency response information in a wearing state of the second earphone. The first frequency response information and the second frequency response information may be in the form of a frequency response curve; the first frequency response information is a first frequency response curve, and the second frequency response information is a second frequency response curve; by fitting the first frequency response curve and the second frequency response curve with the frequency response curves of the preset frequency response information in the mapping table of the preset frequency response information and the optimal noise reduction amount respectively, the optimal noise reduction amount corresponding to the frequency response curve with the highest fitting degree between the first frequency response curve and the second frequency response curve is used as the corresponding first optimal noise reduction amount and second optimal noise reduction amount. Similarly, it can be known that the frequency response values corresponding to the low frequency, intermediate frequency and high frequency in the first frequency response information and the second frequency response information can also be compared with the preset frequency response information in the mapping table to obtain the corresponding optimal noise reduction amount.

Step S300, obtaining a common noise reduction amount according to the optimal noise reduction information;

Specifically, the optimal noise reduction information may include a first optimal noise reduction amount and a second optimal noise reduction amount. The first earphone and the second earphone can interact to obtain the optimal noise reduction amount of the other party through a preset communication channel between the two, such as a wire, a Bluetooth link, etc., that is, after obtaining the first optimal noise reduction amount, the first earphone sends the first optimal noise reduction amount to the second earphone through the preset communication channel, and after obtaining the second optimal noise reduction amount, the second earphone sends the second optimal noise reduction amount to the first earphone through the preset communication channel. Thus, both the first earphone and the second earphone obtain the first optimal noise reduction amount and the second optimal noise reduction amount; and then the first optimal noise reduction amount and the second optimal noise reduction amount can be in comparison, and the optimal noise reduction amount with a lower value is selected as the common noise reduction amount, or any noise reduction amount between the preset minimum noise reduction amount and the lower value optimal noise reduction amount can be selected as the common noise reduction amount.

In another embodiment, step S300 includes:

Step S310, determining whether the first optimal noise reduction amount is greater than the second optimal noise reduction amount;

Step S311, if it is greater than the second optimal noise reduction amount, configuring the second optimal noise reduction amount as a common noise reduction amount;

Step S312, if it is less than or equal to the second optimal noise reduction amount, configuring the first optimal noise reduction amount as a common noise reduction amount.

Specifically, it is determined whether the first optimal noise reduction amount is greater than the second optimal noise reduction amount; if the first optimal noise reduction amount is greater than the second optimal noise reduction amount, the second optimal noise reduction amount is used as the common noise reduction amount; if the first optimal noise reduction amount is less than or equal to the second optimal noise reduction amount, the first optimal noise reduction amount is used as the common noise reduction amount. By selecting the optimal noise reduction amount with a lower numerical value as the common noise reduction amount, both the first earphone and the second earphone can achieve the common noise reduction amount, so that the final noise reduction effect of the first earphone and the second earphone is consistent, thereby achieving better noise reduction effect.

Step S400, controlling the first earphone and the second earphone to perform noise reduction according to the common noise reduction amount.

Specifically, by adjusting the current active noise reduction parameters of the first earphone and the second earphone, the current noise reduction amounts of the first earphone and the second earphone are both adjusted to the common noise reduction amount.

In another embodiment, step S400 includes the following steps:

Step S410, adjusting the active noise reduction parameters of the first earphone and the second earphone, so as to adjust the current noise reduction amount of the first earphone and the second earphone to the common noise reduction amount in a first preset amplitude.

Specifically, by adjusting the active noise reduction parameters of the first earphone and the second earphone, the current noise reduction amount of the first earphone and the second earphone is adjusted to the common noise reduction amount by a first preset amplitude. The first preset amplitude is the preset adjustment range for the current noise reduction amount, for example, the current noise reduction amount is 15 dB, and the common noise reduction amount is 25 dB; then the current noise reduction amount can be first adjusted from 15 dB to 20 dB through the active noise reduction parameters, and then adjusted from 20 dB to 25 dB, so as to realize smooth switching of the first earphone and the second earphone from the current noise reduction amount to the common noise reduction amount.

In the first embodiment of the present application, the wearing fit information of the earphone can be acquired by detecting the leakage information of the sound wave in real time or periodically. The wearing fit information includes wearing fit information of the first earphone and wearing fit information of the second earphone. The optimal noise reduction information corresponding to the first earphone and the second earphone can be obtained based on the corresponding relationship between different wearing fit degrees and the theoretical optimal noise reduction amount according to the wearing fit information of the first earphone and the wearing fit information of the second earphone. By analyzing the optimal noise reduction information, the amount of noise reduction that can be achieved by both the first earphone and the second earphone is obtained as the common noise reduction amount; and by adjusting the current active noise reduction parameters of the first earphone and the second earphone, so as to adjust the current noise reduction amounts of the first earphone and the second earphone to the common noise reduction amount. In this embodiment, by obtaining the optimal noise reduction information of the first earphone and the second earphone, and then the noise reduction amount of the first earphone and the second earphone is adjusted to the common noise reduction amount that both can achieve, thus while maintaining a relatively high amount of noise reduction, the consistency of the noise reduction effects of the first earphone and the second earphone is achieved.

Figure 2:
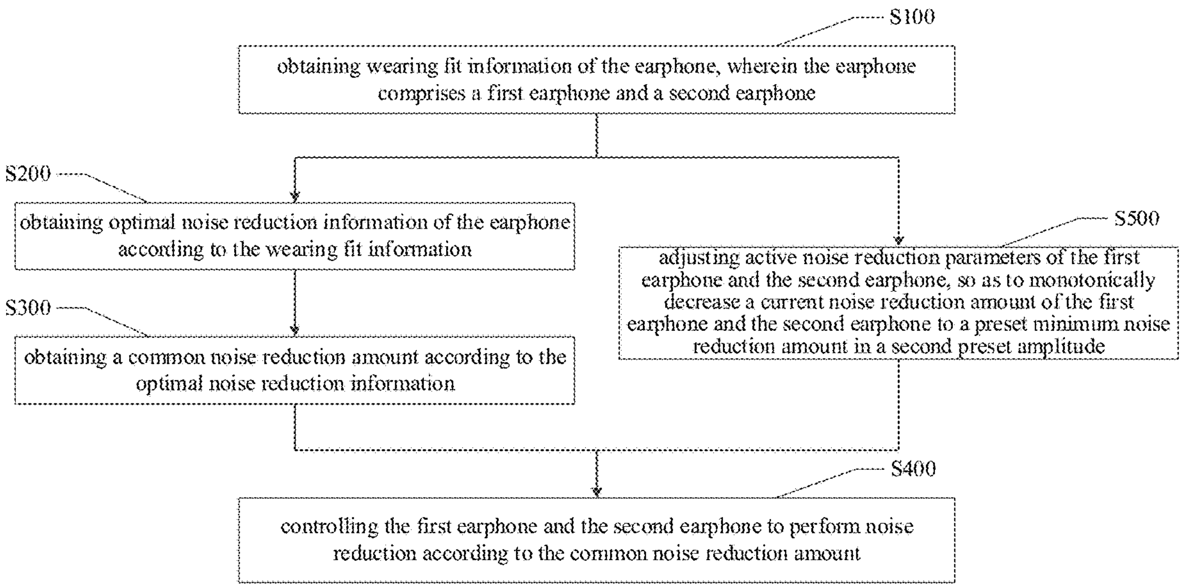
FIG. 2 is a schematic flow diagram of the method of active noise reduction for the earphone according to a second embodiment of the present application.

Further, referring to FIG. 2, the second embodiment of the present application provides a method of active noise reduction for an earphone. Based on the above-mentioned embodiment shown in FIG. 1, the following steps are also included before step S400:

Step S500, adjusting the active noise reduction parameters of the first earphone and the second earphone, so as to monotonically decrease the current noise reduction amount of the first earphone and the second earphone to the preset minimum noise reduction amount in a second preset amplitude.

Specifically, since the process of obtaining the common noise reduction amount by analyzing the wearing fit information in step S200 and step S300 often takes a certain amount of time to complete, therefore, while obtaining the common noise reduction amount, you can adjust the active noise reduction parameters of the first earphone and the second earphone. The current noise reduction amount of the first earphone and the second earphone is monotonously decreased to the preset minimum noise reduction amount at the second preset amplitude, and the above-mentioned monotonous decrease is to decrease according to the single change direction of the value from large to small, which is similar to the meaning of monotonous decrease in the monotonic function, that is, the numerical change of the current noise reduction amount is uniform during the process of adjusting the current noise reduction amount to the preset minimum noise reduction amount, without a combination of increasing and decreasing. The second preset amplitude is also a preset adjustment range for the current noise reduction amount, and the second preset amplitude may be the same adjustment range as the first preset amplitude, or may be the different adjustment range. For example, the current noise reduction amount of the first earphone is 15 dB, the current noise reduction amount of the second earphone is 20 dB, and the preset minimum noise reduction amount is 5 dB. Then the first earphone can reduce the current noise reduction amount of the first earphone from 15 dB to 10 dB first by adjusting the active noise reduction parameters, and then from 10 dB to 5 dB; by adjusting the active noise reduction parameters, the first earphone can first decrease the current noise reduction of the second earphone from 20 dB to 15 dB, then from 15 dB to 10 dB, and finally from 10 dB to 5 dB. It can be understood that the current noise reduction amounts of the first earphone and the second earphone may also be monotonously decreased to a preset minimum noise reduction amount at the same time. Then the active noise reduction parameters of the first earphone and the second earphone can be adjusted according to the common noise reduction amount, and the noise reduction amount of the first earphone and the second earphone is increased from the preset minimum noise reduction amount to the common noise reduction amount with the first preset amplitude. In this embodiment, first the current noise reduction amount of the first earphone and the second earphone is monotonously decreased to the preset minimum noise reduction amount with the second preset amplitude, so that the first earphone and the second earphone can be quickly adjusted to the same noise reduction effect; after the common noise reduction amount is obtained, the noise reduction amount of the first earphone and the second earphone is adjusted from the preset minimum noise reduction amount to the common noise reduction amount, so that the first earphone and the second earphone maintain the same noise reduction effect while increasing the noise reduction amount. The noise reduction effect of the first earphone and the second earphone can be adjusted smoothly in real time, avoiding the hysteresis of the adjustment of the noise reduction effect and the howling caused by the sudden change of the noise reduction amount, thus bringing a better user experience.

Figure 3:
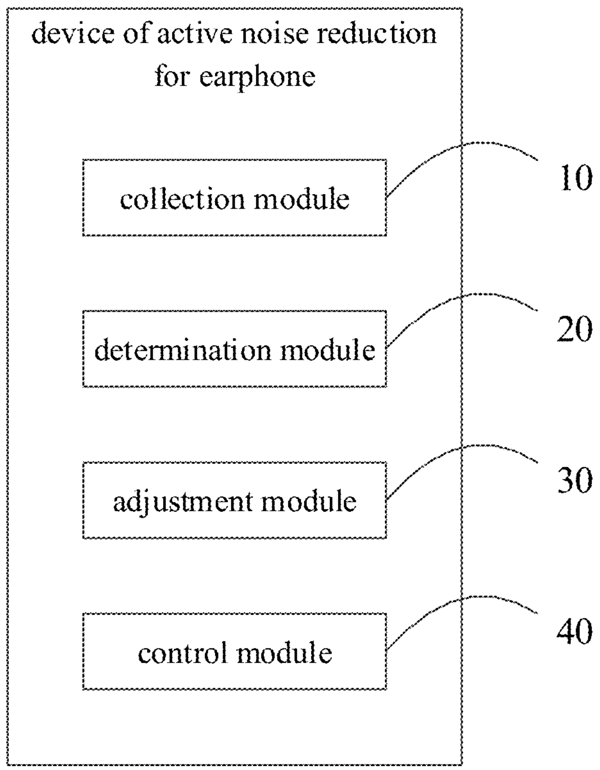
FIG. 3 is a schematic structural diagram of a device of active noise reduction for an earphone according to an embodiment of the present application.

As shown in FIG. 3, FIG. 3 is a schematic structural diagram of a device of active noise reduction for an earphone according to an embodiment of the present application.

An embodiment of the present application provides a device of active noise reduction for an earphone, and the device of active noise reduction for the earphone includes:

A detection module 10, configured to obtain wearing fit information of the earphone, the earphone including a first earphone and a second earphone;

A calculation module 20, configured to obtain optimal noise reduction information of the earphone according to the wearing fit information;

An selection module 30, configured to obtain a common noise reduction amount according to the optimal noise reduction information;

An execution module 10, configured to control the first earphone and the second earphone to perform noise reduction according to the common noise reduction amount.

Furthermore, the optimal noise reduction information includes a first optimal noise reduction amount and a second optimal noise reduction amount, and the device of active noise reduction for the earphone further includes: the wearing fit information includes the first frequency response information of the first earphone and the second frequency response information of the second earphone;

The calculation module 20 is further configured to obtain the first optimal noise reduction amount and the second optimal noise reduction amount according to the first frequency response information, the second frequency response information and the mapping tablet between the preset frequency response information and the optimal noise reduction amount.

Further, the device of active noise reduction for the earphone also includes:

The selection module 30, further configured to determine whether the first optimal noise reduction amount is greater than the second optimal noise reduction amount;

The selection module 30, further configured to use the second optimal noise reduction amount as a common noise reduction amount if it is greater than the second optimal noise reduction amount;

The selection module 30, further configured to use the first optimal noise reduction amount as a common noise reduction amount if it is less than or equal to the second optimal noise reduction amount.

Further, the device of active noise reduction for the earphone also includes:

The execution module 40, further configured to adjust the active noise reduction parameters of the first earphone and the second earphone, so as to adjust the current noise reduction amount of the first earphone and the second earphone to the common noise reduction amount at the first preset amplitude.

Further, the device of active noise reduction for the earphone also includes:

The execution module 40, further configured to adjust the active noise reduction parameters of the first earphone and the second earphone, so as to monotonically decrease the current noise reduction amount of the first earphone and the second earphone to a preset minimum noise reduction amount in a second preset amplitude.

Furthermore, the wearing fit information also includes the current noise reduction amount of the earphone, and the device of active noise reduction for the earphone further includes: a reminder module;

A reminder module, configured to determine whether the current noise reduction amount is less than the preset minimum noise reduction amount; A reminder module, configured to output a preset reminder message to remind the user to wear the earphone again if it is less than the preset minimum noise reduction amount;

A reminder module, configured to execute the step of: obtaining the optimal noise reduction information of the earphone according to the wearing fit information if it is greater than or equal to the preset minimum noise reduction amount.

Furthermore, the device of active noise reduction for the earphone also includes: a trigger module;

A trigger module, configured to determine whether the earphone has received preset trigger information;

A trigger module, configured to execute the step of: obtaining the wearing fit information of the earphone if the preset trigger information is received.

Figure 4:
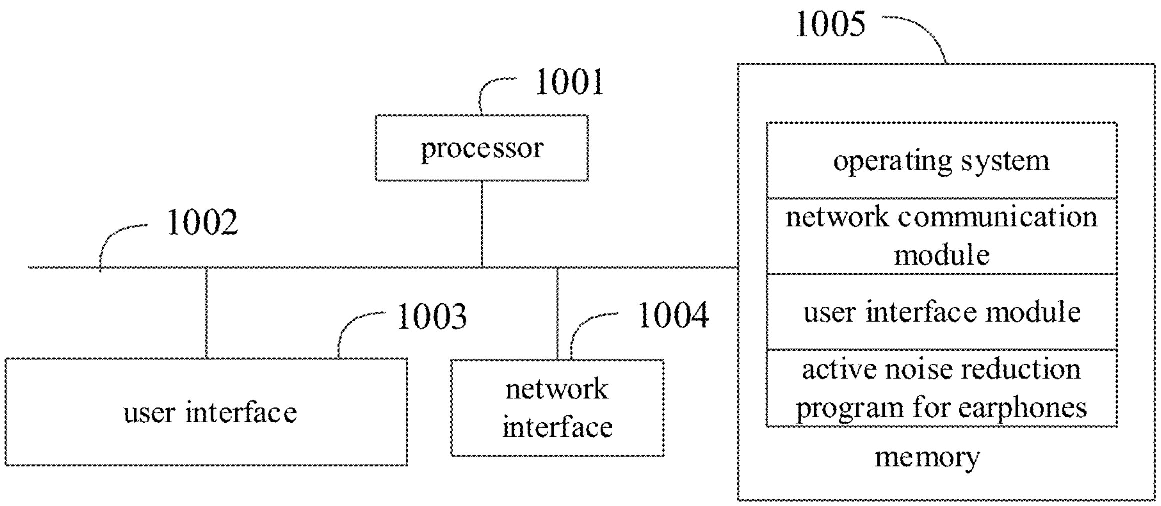
FIG. 4 is a schematic structural diagram of an active noise reduction earphone in a hardware operating environment according to an embodiment of the present application.

As shown in FIG. 4, FIG. 4 is a schematic structural diagram of an active noise reduction earphone in a hardware operating environment according to an embodiment of the present application.

The embodiment of the present application also provides an active noise reduction earphone, which may be a wireless earphone (such as an in-ear, semi-in-ear or head-mounted TWS earphone, etc.) or a wired earphone.

As shown in FIG. 4, the active noise reduction earphone may include: a processor 1001, such as a CPU, a network interface 1004, a user interface 1003, a memory 1005, and a communication bus 1002. The communication bus 1002 is used to realize connection and communication between these components. The user interface 1003 may include a display, an input unit such as a keyboard, and the optional user interface 1003 may also include a standard wired interface and a wireless interface. Optionally, the network interface 1004 may include a standard wired interface and a wireless interface (such as a WI-FI interface). The memory 1005 can be a high-speed RAM memory, or a stable memory (non-volatile memory), such as a disk memory. Optionally, the memory 1005 may also be a storage device independent of the aforementioned processor 1001.

Optionally, the active noise reduction earphone may also include an audio output module, an audio collection module, a sensor, a WiFi module, a Bluetooth module, a control module, and the like. Among them, sensors such as light sensors, motion sensors and other sensors. Specifically, the light sensor may include an ambient light sensor and a proximity sensor. As a kind of motion sensor, the acceleration of gravity sensor can detect the magnitude of acceleration in various directions (generally three axes), and can detect the magnitude and direction of gravity when it is stationary, and can be used to identify the attitude of the device and related functions of vibration recognition (such as pedometer, tap), etc.; of course, other sensors such as gyroscope, barometer, hygrometer, thermometer, optical line sensor, etc. can also be configured, which will not be repeated here.

Those skilled in the art can understand that the structure of the active noise reduction earphone shown in FIG. 4 does not constitute a limitation to the active noise reduction earphone, and may include more or less components than those shown in the figure, or combine certain components, or different component arrangements.

As shown in FIG. 4, the memory 1005 as a computer storage medium may include an operating system, a network communication module, a user interface module, and an active noise reduction application program.

In the device shown in FIG. 4, the processor 1001 can be used to call the active noise reduction program stored in the memory 1005, and perform the following operations:

Obtaining the wearing fit information of the earphone, where the earphone include a first earphone and a second earphone;

Obtaining the optimal noise reduction information of the earphone according to the wearing fit information;

Obtaining a common noise reduction amount according to the optimal noise reduction information;

Controlling the first earphone and the second earphone to perform noise reduction according to the common noise reduction amount.

Furthermore, the optimal noise reduction information includes the first optimal noise reduction amount and the second optimal noise reduction amount. The processor 1001 can also be used to call the active noise reduction program stored in the memory 1005, and perform the following operations:

The wearing fit information includes first frequency response information of the first earphone and second frequency response information of the second earphone;

According to the first frequency response information, the second frequency response information, and a mapping table between the preset frequency response information and optimal noise reduction amount, a first optimal noise reduction amount and a second optimal noise reduction amount are obtained.

Furthermore, the processor 1001 can also be used to call the active noise reduction program stored in the memory 1005, and perform the following operations:

Determining whether the first optimal noise reduction amount is greater than the second optimal noise reduction amount;

If it is greater than the second optimal noise reduction amount, then configuring the second optimal noise reduction amount as a common noise reduction amount;

If it is less than or equal to the second optimal noise reduction amount, then configuring the first optimal noise reduction amount as a common noise reduction amount.

Furthermore, the processor 1001 can also be used to call the active noise reduction program stored in the memory 1005, and perform the following operations:

Adjusting the active noise reduction parameters of the first earphone and the second earphone, so as to adjust the current noise reduction amount of the first earphone and the second earphone to the common noise reduction amount in the first preset amplitude.

Furthermore, the processor 1001 can also be used to call the active noise reduction program stored in the memory 1005, and perform the following operations:

Adjusting the active noise reduction parameters of the first earphone and the second earphone, so as to monotonically decrease the current noise reduction amount of the first earphone and the second earphone to the preset minimum noise reduction amount in the second preset amplitude.

Furthermore, the processor 1001 can also be used to call the active noise reduction program stored in the memory 1005, and perform the following operations:

Determining whether the current noise reduction amount is less than the preset minimum noise reduction amount;

If it is less than the preset minimum noise reduction amount, a preset reminder message is output to remind the user to wear the earphone again;

If it is greater than or equal to the preset minimum noise reduction amount, the step of: obtaining the optimal noise reduction information of the earphone according to the wearing fit information is performed.

Furthermore, the processor 1001 can also be used to call the active noise reduction program stored in the memory 1005, and perform the following operations:

Determining whether the earphone receives the preset trigger information;

If the preset trigger information is received, the step of obtaining the wearing fit information of the earphone is performed.

In addition, the embodiment of the present application also provides a computer storage medium.

A computer program is stored on the computer storage medium, and when the computer program is executed by the processor, the operations in the method of active noise reduction for the earphone provided in the foregoing embodiments are implemented.

It can be understood that the above scenario is only an example, and does not constitute a limitation on the present application scenario of the technical solution provided by the embodiment of the present application, and the technical solution of the present application can also be applied to other scenarios. For example, those skilled in the art know that with the evolution of the system architecture and the emergence of new business scenarios, the technical solutions provided in the embodiments of the present application are also applicable to similar technical problems.

The serial numbers of the above embodiments of the present application are for description only, and do not represent the advantages and disadvantages of the embodiments.

The steps in the methods of the embodiments of the present application can be adjusted, combined and deleted according to actual needs.

Units in the device in the embodiment of the present application may be combined, divided and deleted according to actual needs.

In the present application, descriptions of the same or similar terms, concepts, technical solutions and/or application scenarios are generally only described in detail when they appear for the first time, and when they appear repeatedly later, for the sake of brevity, they are generally not repeated. When understanding the technical solutions and other contents of the present application, for the same or similar term concepts, technical solutions and/or application scenario descriptions that are not described in detail later, you can refer to the previous relevant detailed descriptions.

In the present application, the description of each embodiment has its own emphasis. For the parts that are not detailed or recorded in a certain embodiment, please referring to the relevant descriptions of other embodiments.

The various technical features of the technical solution of the present application can be combined arbitrarily. For the sake of concise description, all possible combinations of the various technical features in the above-mentioned embodiments are not described. However, as long as there is no contradiction in the combination of these technical features, they should be regarded as the scope described in the present application.

Through the description of the above embodiments, those skilled in the art can clearly understand that the methods of the above embodiments can be implemented by means of software plus a necessary general-purpose hardware platform, and of course also by hardware, but in many cases the former is better implementation. Based on this understanding, the technical solution of the present application can be embodied in the form of a software product in essence or in other words, the part that contributes to the related art, and the computer software product is stored in one of the above storage media (such as ROM/RAM, magnetic CD, CD), including several instructions to make a terminal device (which may be a mobile phone, computer, server, controlled terminal, or network device, etc.) execute the method of each embodiment of the present application.

In the above embodiments, all or part of them may be implemented by software, hardware, firmware or any combination thereof. When implemented using software, it may be implemented in whole or in part in the form of a computer program product. A computer program product includes one or more computer instructions. When the computer program instructions are loaded and executed on the computer, the processes or functions according to the embodiments of the present application will be generated in whole or in part. A computer can be a general purpose computer, special purpose computer, a computer network, or other programmable apparatus. Computer instructions can be stored in or transmitted from one computer-readable storage medium to another computer-readable storage medium, for example, computer instructions can be sent from a website site, computer, server or data center by wire (such as coaxial cable, optical fiber, digital subscriber line) or wireless (such as optical, wireless, microwave, etc.) to another website site, computer, server or data center. The computer-readable storage medium may be any available medium that can be accessed by a computer, or a data storage device such as a server, a data center, etc. integrated with one or more available media. Usable media may be magnetic media, (eg, floppy disk, memory disk, magnetic tape), optical media (eg, DVD), or semiconductor media (eg, solid state disk (SSD)).

The above are only some embodiments of the present application, and are not intended to limit the patent scope of the present application. All equivalent structures or equivalent process transformations made by using the description of the present application and the accompanying drawings, directly or indirectly used in other related technical fields, are all included in the protection scope of the present application in the same way.

What is claimed is:

1. A method of active noise reduction for an earphone, comprising:

obtaining wearing fit information of the earphone, wherein the earphone comprises a first earphone and a second earphone;

obtaining optimal noise reduction information of the earphone according to the wearing fit information;

obtaining a common noise reduction amount according to the optimal noise reduction information; and controlling the first earphone and the second earphone to perform noise reduction according to the common noise reduction amount, wherein the optimal noise reduction information comprises a first optimal noise reduction amount and a second optimal noise reduction amount, wherein the obtaining the common noise reduction amount according to the optimal noise reduction information comprises:

determining whether the first optimal noise reduction amount is greater than the second optimal noise reduction amount;

in response to that the first optimal noise reduction amount is greater than the second optimal noise reduction amount, configuring the second optimal noise reduction amount as the common noise reduction amount; and in response to that the first optimal noise reduction amount is less than or equal to the second optimal noise reduction amount, configuring the first optimal noise reduction amount as the common noise reduction amount.

2. The method of active noise reduction for the earphone according to claim 1, wherein the wearing fit information comprising first frequency response information of the first earphone and second frequency response information of the second earphone;

the obtaining the optimal noise reduction information of the earphone according to the wearing fit information comprises:

obtaining the first optimal noise reduction amount and the second optimal noise reduction amount according to the first frequency response information, the second frequency response information, and a mapping table between preset frequency response information and an optimal noise reduction amount.

3. The method of active noise reduction for the earphone according to claim 1, wherein the controlling the first earphone and the second earphone to perform noise reduction according to the common noise reduction amount comprises:

adjusting active noise reduction parameters of the first earphone and the second earphone, so as to adjust a current noise reduction amount of the first earphone and the second earphone to the common noise reduction amount in a first preset amplitude.

4. The method of active noise reduction for the earphone according to claim 1, wherein before the controlling the first earphone and the second earphone to perform noise reduction according to the common noise reduction amount, the method further comprises:

adjusting active noise reduction parameters of the first earphone and the second earphone, so as to monotonically decrease a current noise reduction amount of the first earphone and the second earphone to a preset minimum noise reduction amount in a second preset amplitude.

5. The method of active noise reduction for the earphone according to claim 1, wherein the wearing fit information further comprises a current noise reduction amount of the earphone, and after the obtaining the wearing fit information of the earphone, the method further comprises:

determining whether the current noise reduction amount is less than a preset minimum noise reduction amount;

in response to that the current noise reduction amount is less than the preset minimum noise reduction amount, outputting a preset reminder message to remind the user to wear the earphone again; and in response to that the current noise reduction amount is greater than or equal to the preset minimum noise reduction amount, obtaining the optimal noise reduction information of the earphone according to the wearing fit information.

6. The method of active noise reduction for the earphone according to claim 1, wherein before the obtaining the wearing fit information of the earphone, the method further comprises:

determining whether preset trigger information is received by the earphone; and in response to that the preset trigger information is received, obtaining the wearing fit information of the earphone.

7. An active noise reduction earphone, comprising:

a memory;

a processor; and a computer program stored in the memory and operable on the processor;

wherein when the computer program is executed by the processor, the steps of the method of active noise reduction for the earphone according to claim 1 are realized.

8. A non-transitory computer-readable storage medium, storing an active noise reduction program, wherein when the active noise reduction program is executed by a processor, the steps of the method of active noise reduction for the earphone according to claim 1 are realized.

9. A device of active noise reduction for an earphone, comprising:

a detection module, configured to obtain wearing fit information of the earphone, wherein the earphone comprises a first earphone and a second earphone;

an operation module, configured to obtain optimal noise reduction information of the earphone according to the wearing fit information;

a selection module, configured to obtain a common noise reduction amount according to the optimal noise reduction information; and an execution module, configured to control the first earphone and the second earphone to perform noise reduction according to the common noise reduction amount, wherein the optimal noise reduction information comprises a first optimal noise reduction amount and a second optimal noise reduction amount, wherein the selection module is further configured to determine whether the first optimal noise reduction amount is greater than the second optimal noise reduction amount, configure the second optimal noise reduction amount as the common noise reduction amount when the first optimal noise reduction amount is greater than the second optimal noise reduction amount, and configure the first optimal noise reduction amount as the common noise reduction amount when the first optimal noise reduction amount is less than or equal to the second optimal noise reduction amount.

* * * * *